(12) United States Patent
Zoldi et al.

(10) Patent No.: US 11,093,845 B2
(45) Date of Patent: Aug. 17, 2021

(54) TREE PATHWAY ANALYSIS FOR SIGNATURE INFERENCE

(71) Applicant: FAIR ISAAC CORPORATION, San Jose, CA (US)

(72) Inventors: Scott Zoldi, San Diego, CA (US); Yuting Jia, San Diego, CA (US); Heming Xu, San Diego, CA (US)

(73) Assignee: Fair Isaac Corporation, Roseville, MN (US)

( * ) Notice: Subject to any disclaimer, the term of this patent is extended or adjusted under 35 U.S.C. 154(b) by 524 days.

(21) Appl. No.: 14/720,623

(22) Filed: May 22, 2015

(65) Prior Publication Data
US 2016/0342963 A1 Nov. 24, 2016

(51) Int. Cl.
*G06N 7/00* (2006.01)
*G06N 5/02* (2006.01)

(52) U.S. Cl.
CPC ............ *G06N 7/005* (2013.01); *G06N 5/025* (2013.01)

(58) Field of Classification Search
USPC .......................................................... 705/39
See application file for complete search history.

(56) References Cited

U.S. PATENT DOCUMENTS

| | | | |
|---|---|---|---|
| 7,539,657 B1 | 5/2009 | Liu et al. | |
| 7,577,709 B1 * | 8/2009 | Kolcz | G06K 9/6217 |
| | | | 709/206 |
| 7,792,770 B1 | 9/2010 | Phoha et al. | |
| 8,095,543 B1 | 1/2012 | Gupta | |
| 8,892,490 B2 | 11/2014 | Wang et al. | |
| 8,997,227 B1 | 3/2015 | Mhatre et al. | |
| 9,323,520 B2 | 4/2016 | Misra et al. | |
| 9,727,821 B2 | 8/2017 | Lin et al. | |
| 2008/0114564 A1 * | 5/2008 | Ihara | G06K 9/6215 |
| | | | 702/158 |

(Continued)

OTHER PUBLICATIONS

"Employing Kullback-Leibler divergence and Latent Dirichlet Allocation for fraud detection in telecommunications", Olszewski, Dominik. Intelligent Data Analysis 16.3: 467-185. IOS Press. (May 29, 2012).*

(Continued)

*Primary Examiner* — Gregory A Pollock
(74) *Attorney, Agent, or Firm* — Mintz Levin Cohn Ferris Glovsky and Popeo, P.C.

(57) ABSTRACT

A method for detecting fraud and non-fraud pattern changes can be based on transaction pathway transversal analysis. A decision tree can be built based on a training dataset from a reference dataset. Pathway transversal information can be recorded along each pathway for the reference dataset. A first mean and a first variance of a class probability can be calculated of all samples over each pathway. A pathway distribution for a new transaction dataset under investigation and a second mean and a second variance of all samples of the new transaction dataset can be obtained. The second mean and the second variance can represent a fraud probability. The deviation metrics between one or more feature statistics of a feature along each pathway for the reference dataset and the new dataset can be determined on a local level. Feature contributors to pattern changes can be determined by analyzing the deviation metrics.

8 Claims, 10 Drawing Sheets

(56) References Cited

U.S. PATENT DOCUMENTS

| | | | |
|---|---|---|---|
| 2010/0169192 A1 | 7/2010 | Zoldi et al. | |
| 2011/0078099 A1 | 3/2011 | Weston et al. | |
| 2014/0058763 A1 | 2/2014 | Zizzamia et al. | |
| 2014/0079297 A1* | 3/2014 | Tadayon | G06K 9/00 382/118 |
| 2014/0180974 A1* | 6/2014 | Kennel | G06N 7/005 706/12 |
| 2014/0201126 A1* | 7/2014 | Zadeh | A61B 5/4803 706/52 |
| 2014/0282856 A1 | 9/2014 | Duke et al. | |
| 2014/0310235 A1 | 10/2014 | Chan et al. | |
| 2014/0324699 A1* | 10/2014 | Ding | G06Q 20/4016 705/44 |
| 2018/0025157 A1 | 1/2018 | Titonis et al. | |

OTHER PUBLICATIONS

"An Introduction to Cluster Analysis for Data Mining." Adobe. (2000) 75 pages.

Barros, R.C. et al. "A Clustering-based Decision Tree Induction Algorithm." *Proceedings of the 2011 11th International Conference on Intelligent Systems Design and Applications* (ISDA). IEEE, 2011. 543-550.

Dalton, Lori, et al. "Clustering Algorithms: On Learning, Validation, Performance, and Applications to Genomics." *Curr Genomics.* Sep. 2009; 10(6) 430-445. (2009) 37 pages. PMC2766793. Accessed Nov. 2, 2018 12:30:00 PM.

Dettmers, Tim. "Deep Learning in a Nutshell: History and Training." Artificial Intelligence. NVIDIA Developer Blog. (Dec. 16, 2015). 12 pages. Accessed May 7, 2018 12:54:49 PM.

Granville, Ph.D, Vincent. "Hidden Decision Trees to Design Predictive Scores—Application to Fraud Detection." AnalyticBridge, (Oct. 27, 2009). 7 pages. https://slideplayer.com/slide/8587917. Slide Show.

Guazzelli, Alex. "Predicting the future, Part 2. Predictive modeling techniques." *IBM* (2012) 15 pages. Accessed Nov. 2, 2018 12:53:21 PM.

Ilic, Milos, et al. "Suffix Tree Clustering—Data mining algorithm." ERK'2014, Portorož, B:15-18 (2014) 4 pages.

Liu, Hao and Xiao-juan Ban. "Clustering by growing incremental self-organizing neural network." *Expert Systems with Applications,* 42.3 (2015): 4965-4981. 17 pages.

Lui, Yuhua, et al. "A new clustering algorithm based on data field in complex networks." *J Supercomput* (2014) 67:723-737.

Quinlan, J. R. "C4.5: Programs for Machine Learning." San Mateo, CA, Morgan Kaufmann Publishers Inc., San Francisco CA, USA (1993) 4 pages.

Raskutti, Bhavani, et al. "Combining Clustering and Co-training to Enhance Text Classification Using Unlabelled Data." SIGKDD 02, Edmonton, Alberta Canada (2002) 620-625, 6 pages.

Salzberg, S.L. "Book Review: C4.5: Programs for Machine Learning by J. Ross Quinlan. Morgan Kaufmann Publishers, Inc., 1993." Machine Learning (1994) 16: 235-240.

Sivaram, N. and K. Ramar. "Applicability of Clustering and Classification Algorithms for Recruitment Data Mining." *International Journal of Computer Applications* (0975-8887) vol. 4, No. 5, 23-28. Jul. 2010. 6 pages.

Vaish, Piush. "A history of Machine Learning." Machine Learning. A Data Analyst. (2016) 5 pages. Accessed May 7, 2018 12:44:46 PM.

Zheng, Yujie. "Clustering Methods in Data Mining with its Applications in High Education." *2012 International Conference on Education Technology and Computer (ICETC2012) IPCSIT* vol. 43 (2012) @ (2012) IACSIT Press, Singapore (2012). 7 pages.

Hu, F., Liu, X., Dai, J., and Yu, H. (2014). "A Novel Algorithm for Imbalance Data Classification Based on Neighborhood Hypergraph." *The Scientific World Journal,* vol. 2014: 876-875 (13 pages). Web. Dec. 16, 2019.

\* cited by examiner

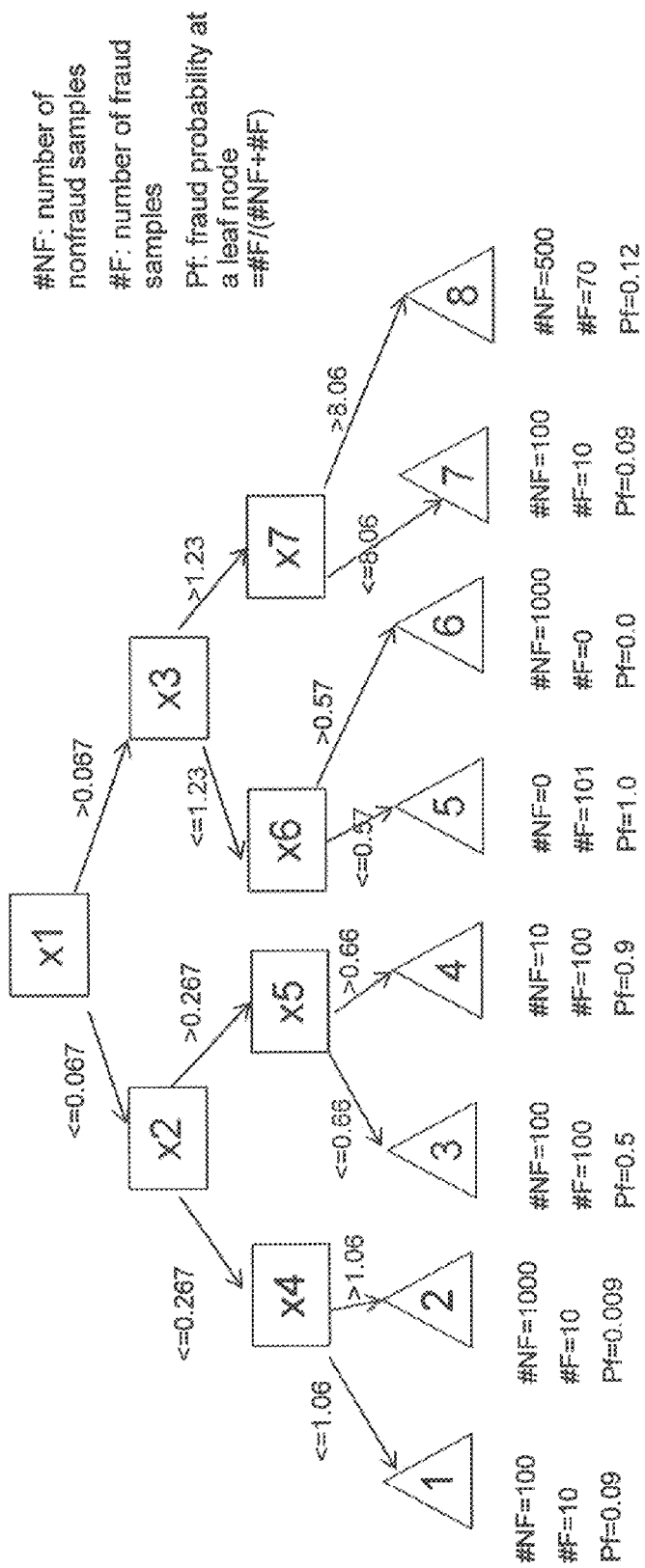

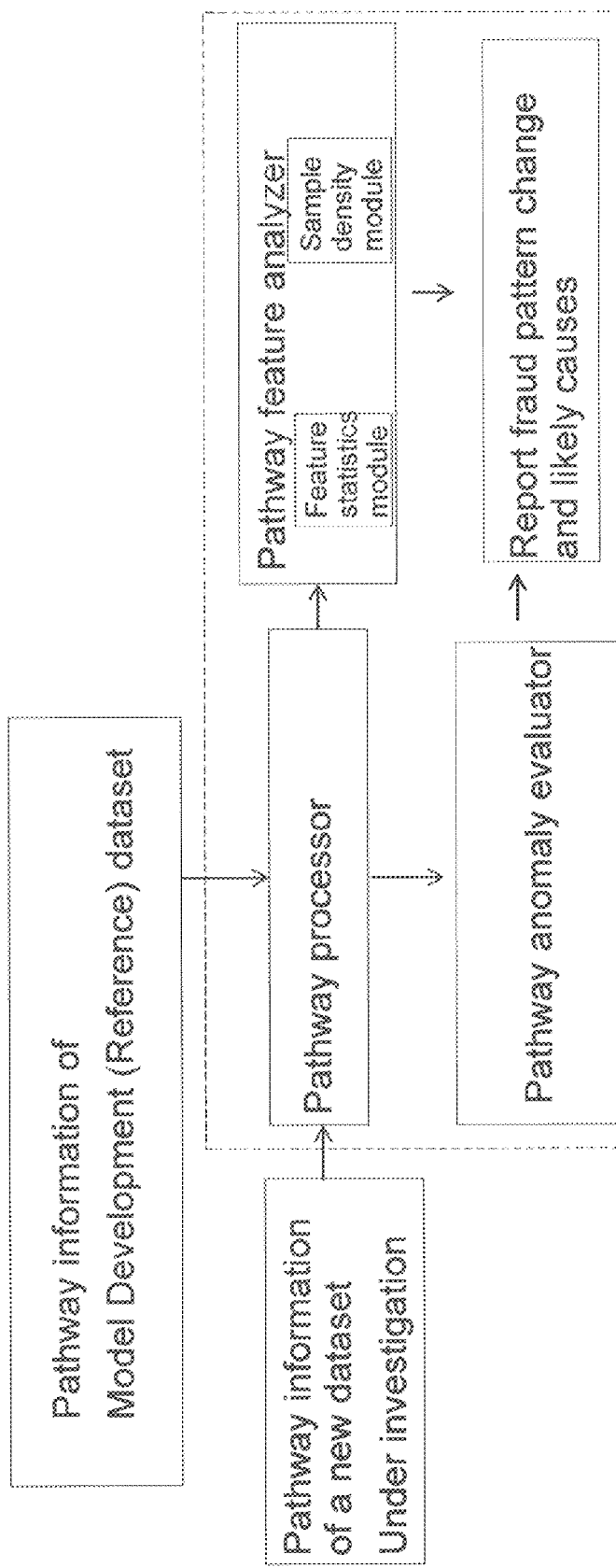
Fig 2 block diagram of evaluation/report system on fraud pattern change

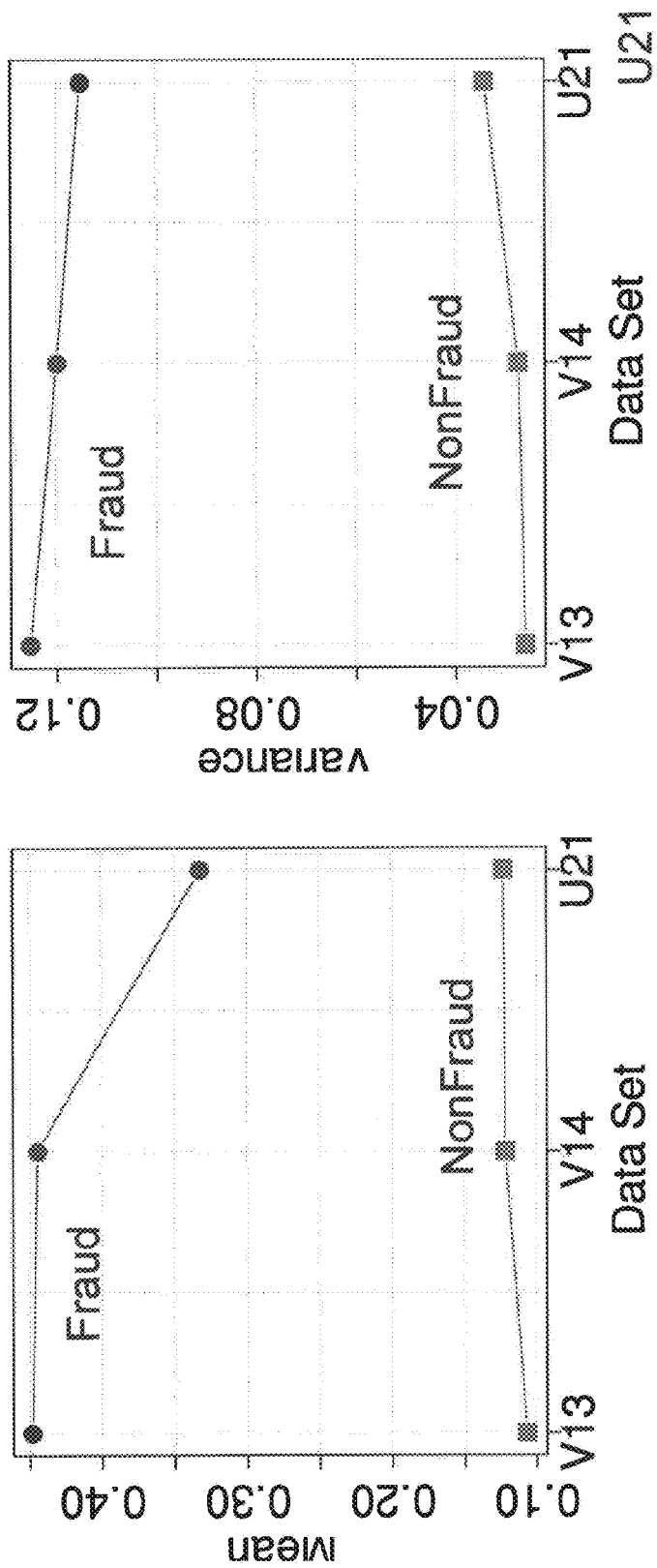

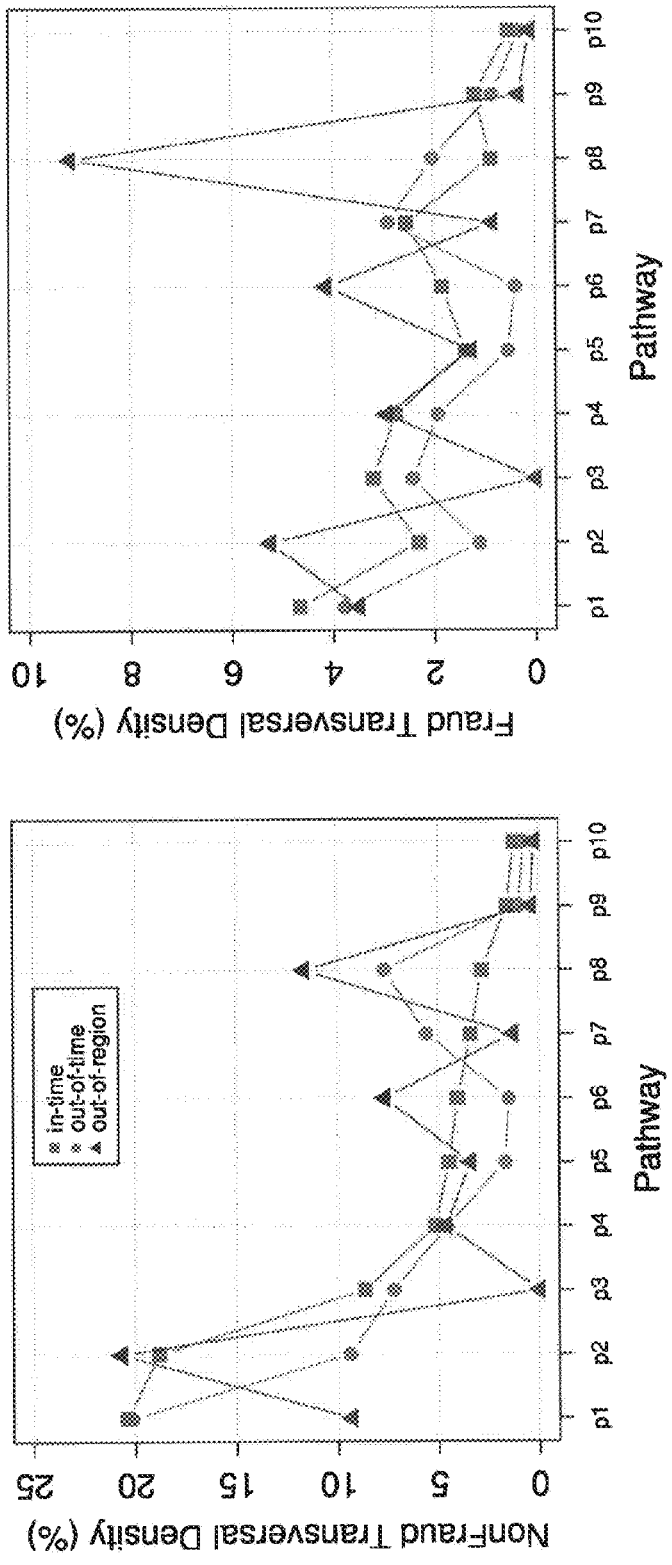
Fig 4 Example Distributions of pathway density: in-time (V13), out-of-time (V14) & out-of-region (U21)

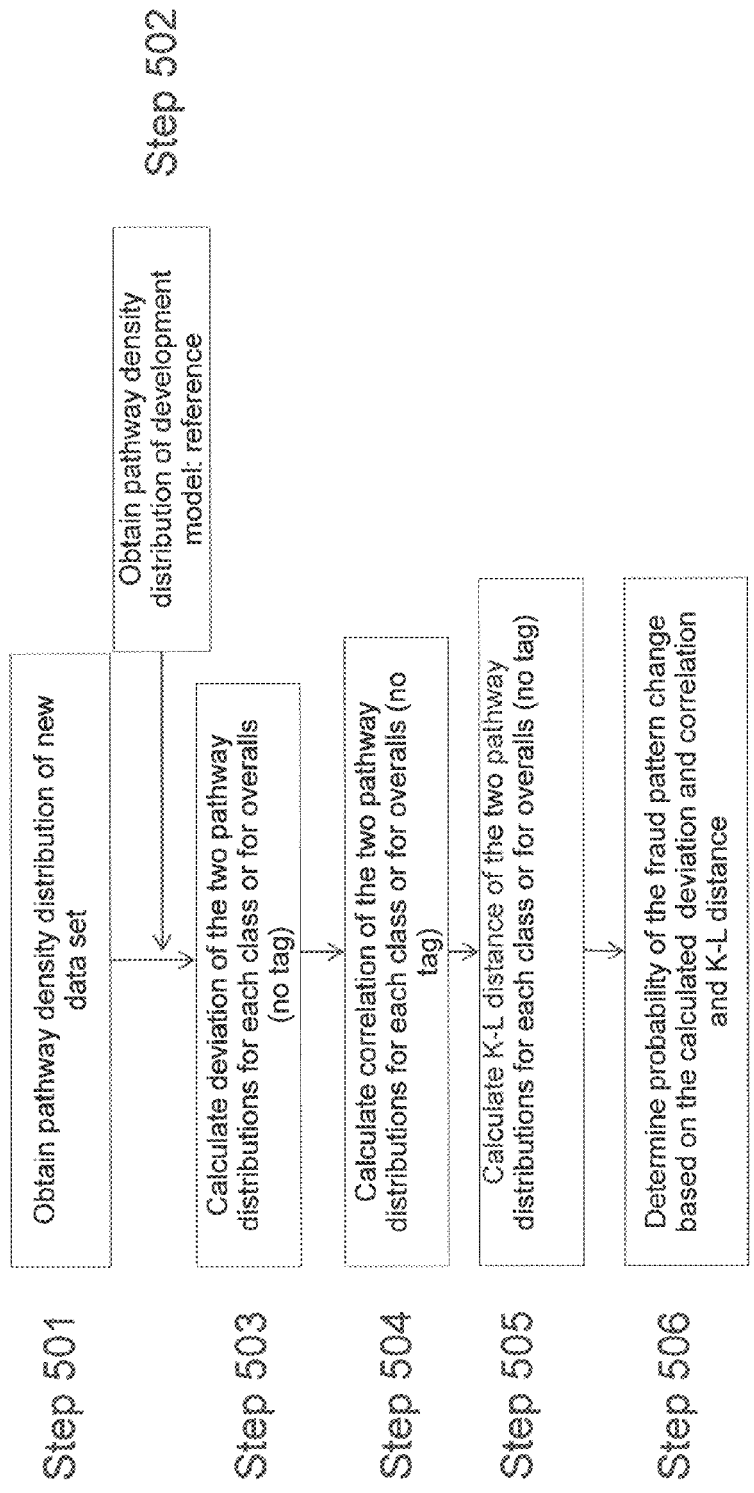

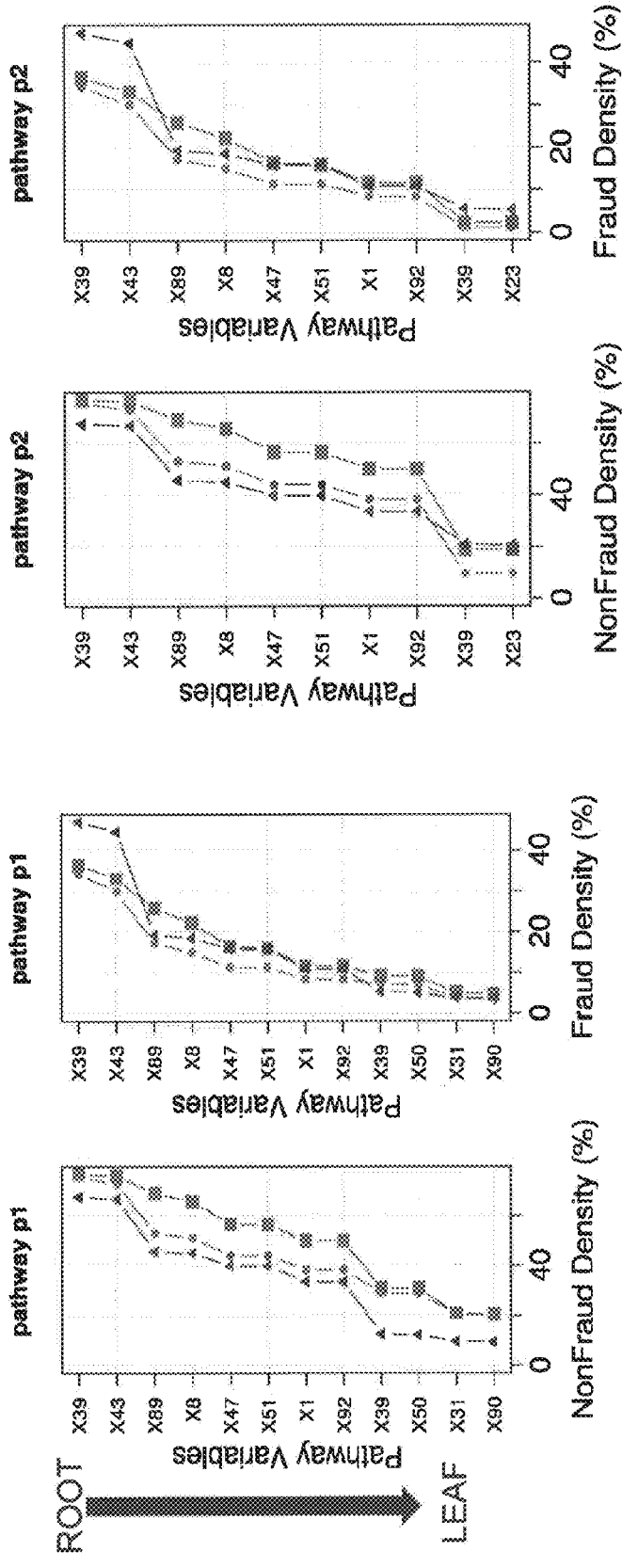
Fig 6 Example sample density along two of top pathways
Pathway P1: ~20% of in-time (square data points) and out-of-time (circle data points) nonfraud samples traverse p1
Pathway P2: ~20% of in-time (square data points) nonfraud samples traverse but only ~10% out-of-time (circle data points) nonfraud samples traverse

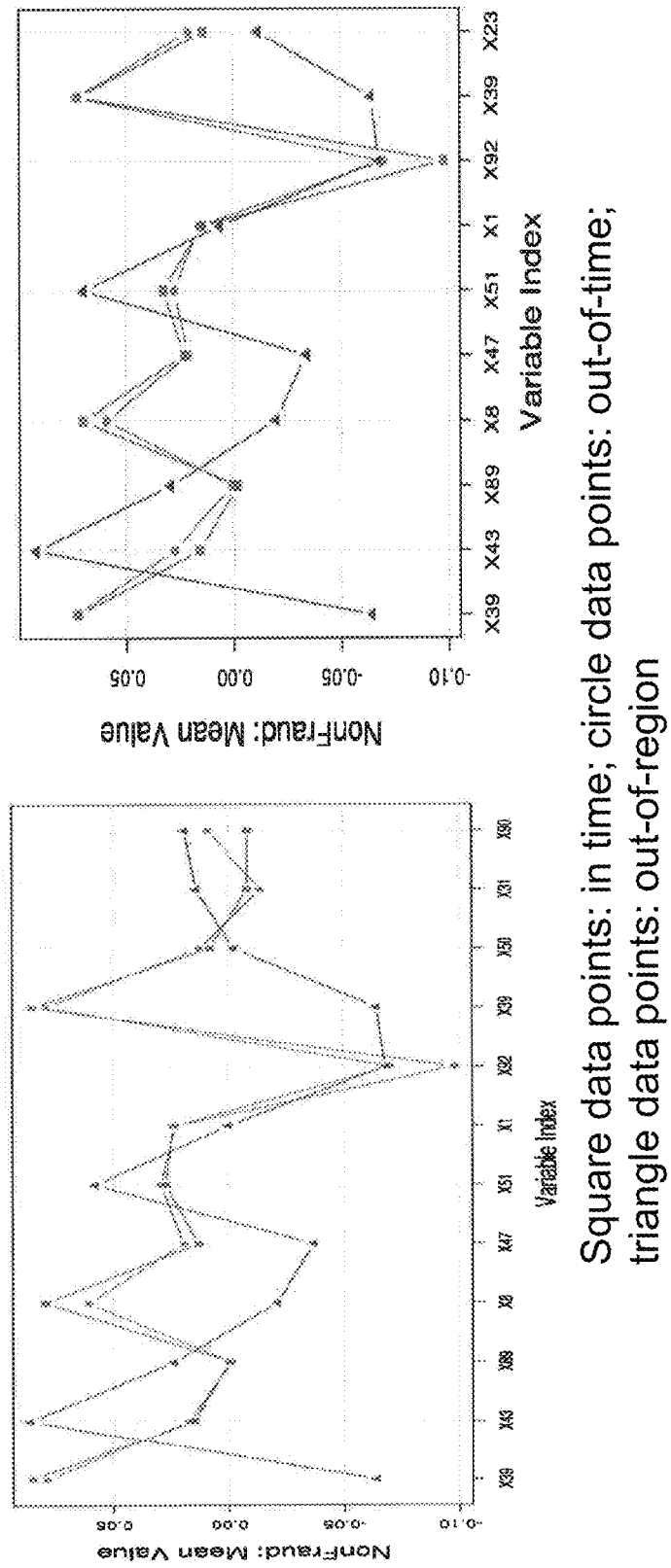

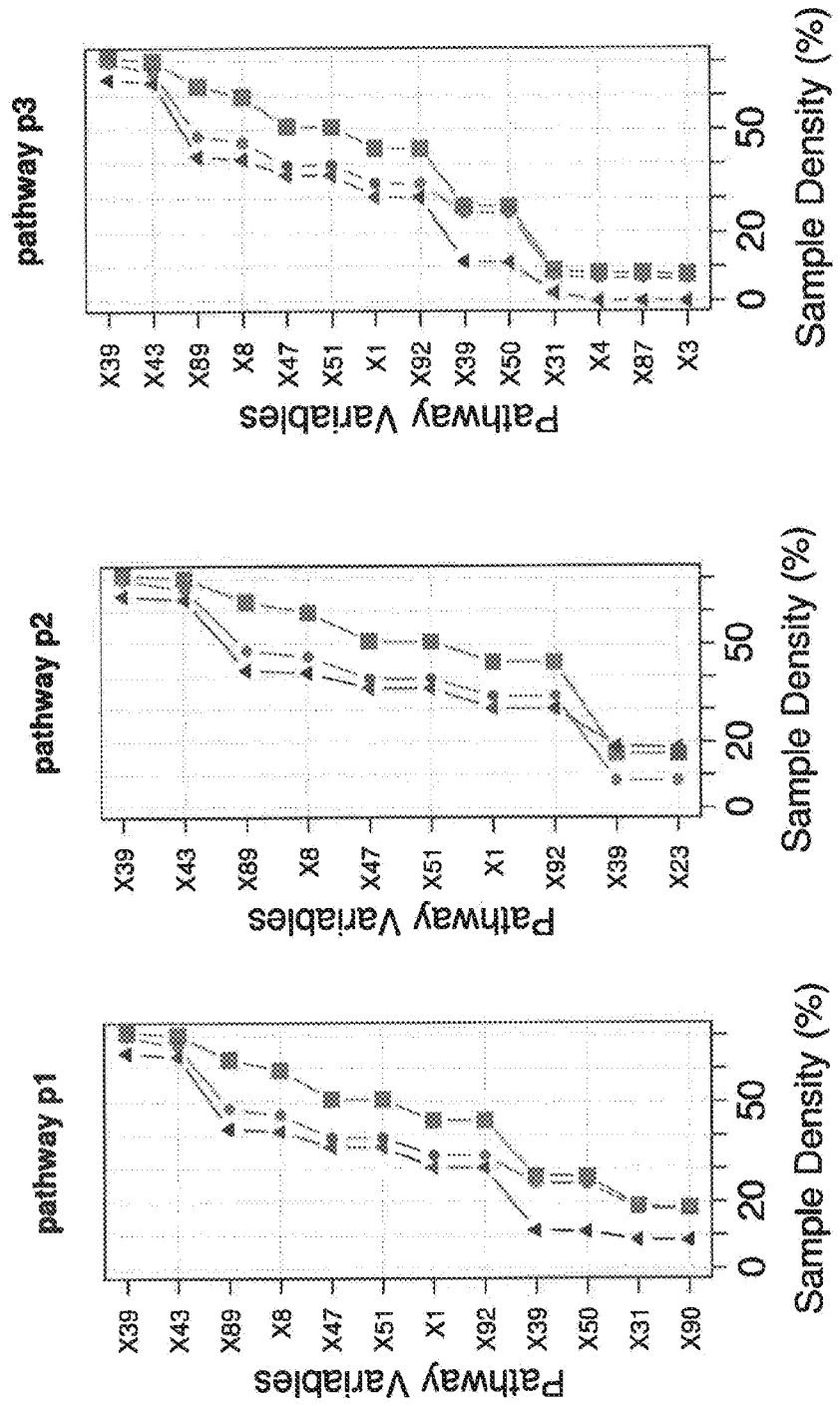

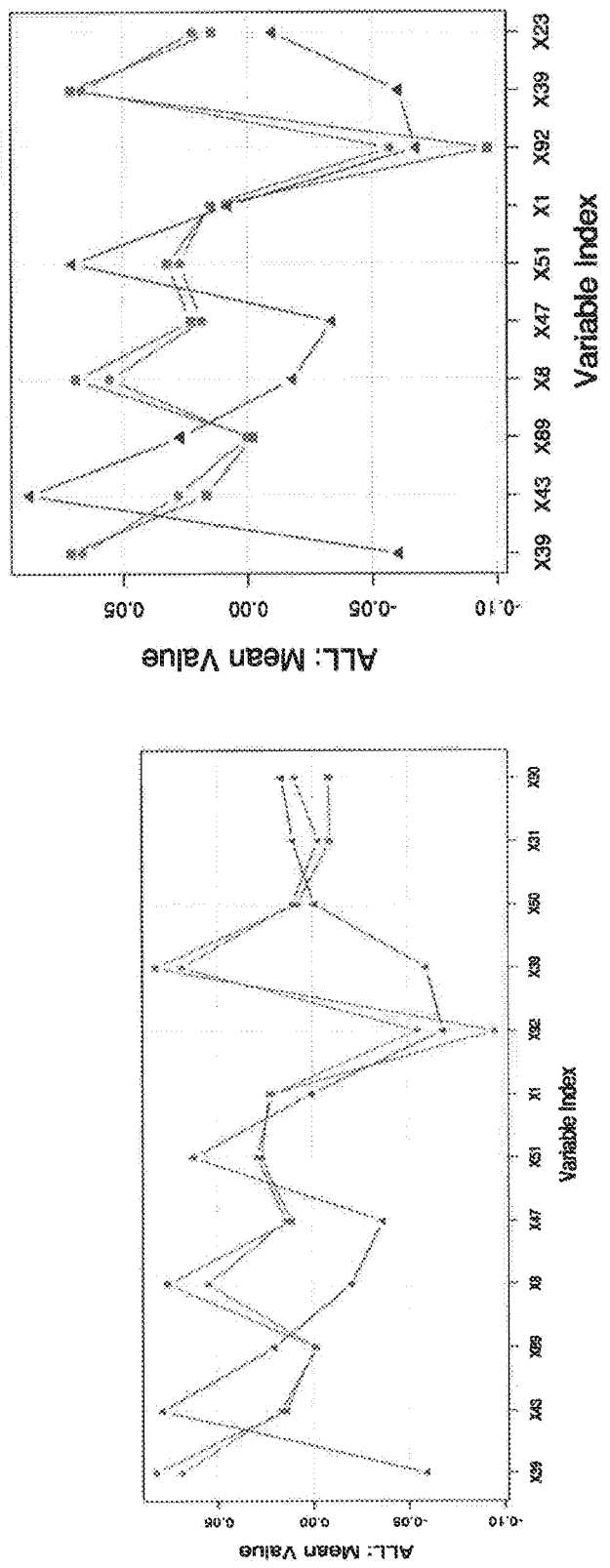
Fig 9 Feature statistics at leaf nodes without
Square data points: in time; circle data points: out-of-time; triangle data points: out-of-region

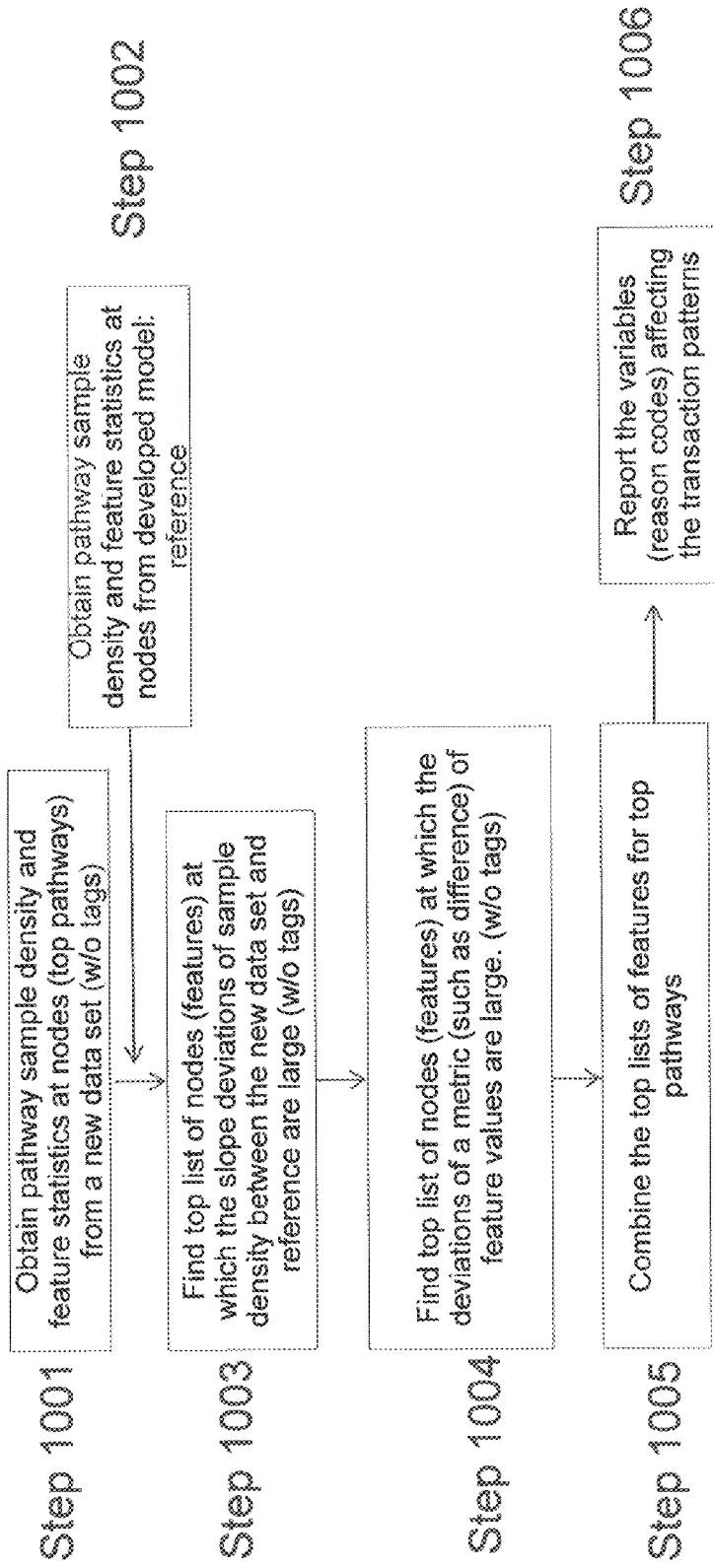

TREE PATHWAY ANALYSIS FOR SIGNATURE INFERENCE

TECHNICAL FIELD

This disclosure relates generally to computer software and payment transaction behavioral pathway analysis. More particularly, this disclosure relates to systems and methods for detecting fraud and non-fraud pattern changes based on transaction pathway transversal analysis and determining the factors underlying the pattern changes.

BACKGROUND

Detecting and recognizing a fraud pattern in payment transactions is an important and complex machine-learning problem. The task involves characterizing the transactions and identifying an underlying reason in the fraud transactions. Generally, real time payment transactions are processed by a card processor to determine whether the transactions are legitimate or fraudulent based on fraud detection models installed at, and executed by, the processor.

The frauds that are determined may include application fraud, counterfeit, friendly fraud, skimming, internet/mail/phone order fraud and lost/stolen etc., and the fraud indicators (reasons) may include transaction times, locations and amounts, merchant types, or more subtle behavior analytic changes. With EMV migration in United States, the fraud types may evolve from time to time and from region to region. Detecting fraud pattern changes is useful in mitigating the monetary loss due to frauds and thus is highly valuable to the card issuers. It also provides essential insights for users of models to understand whether fraudsters are utilizing fraud tactics not well represented in the modeling data, characterizing these new fraud tactics, and allowing clients to write rules or use adaptive models to remedy fraud detection between model upgrades.

There are algorithms and techniques in the data mining field which presently exist for detecting fraudulent transactions. One of the prominent models is the Falcon® model using neural network classification models for many card issuers. Other models include logistic regression, decision trees, etc. Neural network models have been found to be very amenable to the fraud detection systems such as those using the Falcon® model. The neural network is generally an implementation of an algorithm which enables a computer to learn nonlinear relationships between features directly from input data, which is used to train the neural network to detect frauds.

A decision tree is another popular tool for classification and prediction in the form of a tree structure, where each node is either a leaf node or a decision node. A leaf node indicates the value of the target attribute (class) of examples, and a decision node specifies some condition to be carried out on a single attribute-value, with one branch and sub-tree for each possible outcome of the condition. At a leaf node, the majority class among all the classes (which may be more than two) in the samples characterizes the classification of that leaf node and the percentage of the classification class defines the likelihood. As illustrated in FIG. 1, a decision tree can be used to classify an example by starting at the root of the tree, which is depicted with the root at the top, and decision nodes are traversed until one reaches a leaf node, which provides the classification of the example. Further both the decision node and the leaf node can contain essential statistics of features calling into that node.

Decision tree induction is a typical inductive approach to learn knowledge on classification. One such method uses the maximum information gain as a criterion to make a decision node and a split decision. Some of the noticeable benefits of a decision tree are that 1) the tree structure provides a clear indication of which features (variables, attributes and features are used interchangeably) are most important for prediction or classification; 2) the tree structure provides a clear picture of which features are traversed together to reach a leaf node, the path from the root to a leaf node being called a pathway hereafter. As shown in FIG. 1, there are eight distinct pathways in total. Note not all the pathways are traversed at the same frequency, and that some may be more frequently traversed than others. Thus a differentiated preference for certain pathways for many samples may exist. Each dataset traversing the built tree may yield a different set of behavioral pathway distributions and feature distributions along each pathway. The difference in the pathway frequency distribution may suggest changes in the patterns (especially fraud), and the bifurcation points where distributions start to diverge may serve as a marker that is attributable to the pattern change providing unique vantage points on changing fraud patterns.

SUMMARY

Methods and apparatus, including computer program products, are provided for detecting fraud and non-fraud pattern changes based on transaction pathway transversal analysis and determining the factors underlying the pattern changes.

In one aspect, a decision tree is built based on a training dataset from a reference dataset. Pathway transversal information along each pathway is recorded for the reference dataset. A first mean and a first variance of a class probability are calculated of all samples over each pathway. A pathway distribution for a new transaction dataset under investigation and a second mean and a second variance of all samples of the new transaction dataset are obtained. The second mean and the second variance are representative of a fraud probability. A first pathway density distribution is retrieved for the reference dataset. A second pathway density distribution is generated for the new transaction dataset. Deviation metrics between the first pathway density distribution and the second pathway density distribution are determined on a global level. The deviation metrics between the first pathway density distribution and the second pathway density distribution are determined on a local level. The deviation metrics between one or more feature statistics of a feature along each pathway for the reference dataset and the new dataset are determined on a local level. One or more likely feature contributors to one or more pattern changes are determined by analyzing the deviation metrics along each pathway. One or more of an alert and a report are generated based on the deviation metrics according to one or more predetermined criteria.

The above methods, apparatus, and computer program products may, in some implementations, further include one or more of the following features.

Each of the first pathway density distribution and the second pathway density distribution can be representative of a pathway transversal density along each pathway. The pathway transversal density can be normalized by a total number of samples.

The determining the deviation metrics on a global level can include one or more of the following: calculating a deviation between the first pathway density distribution and the second pathway density distribution; calculating a correlation between the first pathway density distribution and the second pathway density distribution; and calculating a K-L distance based on information entropy between the first pathway density distribution and the second pathway density distribution.

A weighted average of the deviation, the correlation, and the K-L distance can be determined. One or more results representative of a difference between the new dataset and the reference dataset can be generated on a global level using at least the weighted average.

The alert can be generated if the weighted average exceeds a predetermined threshold.

The determining the one or more likely feature contributors can be based on a sample density distribution. The determining can include obtaining one or more sample densities at each node on a first pathway for the reference dataset; obtaining one or more sample densities at each node on a second pathway for the new dataset; calculating a sample density slope between adjacent nodes on the first pathway and the second pathway; determining a maximum slope difference between the reference dataset and the new dataset; and compiling a list of the one or more likely features associated with the maximum slope difference.

The determining the one or more likely feature contributors can be based on one or more feature statistics at one or more nodes. The determining can include obtaining one or more data samples at each node on a first pathway for the reference dataset; obtaining one or more data samples at each node on a second pathway for the new dataset; calculating one or more statistics of the data samples at each node on the first pathway and the second pathway; finding a top difference in statistics between the reference dataset and the new dataset; and compiling a list of the one or more likely features associated with the top difference.

A significance of a difference between means of class probabilities on all samples of the reference dataset and all samples of the new dataset can be calculated using a Wilcoxon test.

In another aspect, methods, apparatus, and computer program products are disclosed for detecting fraud pattern changes using pathway transversals and feature statistics by using a decision tree technique, for robust detection and identification of the deviation cause. A deviation of the pathway distribution of the new dataset from that of the reference dataset can be investigated in a global sense. This approach comports with the intuition that the deviation represents a change of the transaction pattern. The distribution of variables (features) along each pathway can be analyzed. The deviation of the sample density distribution and feature statistics at leaf and decision nodes can be analyzed to identify the features of interest and the cause(s) of the deviation.

In yet another aspect, methods, apparatus, and computer program products can calculate the mean and variance of the fraud probability, calculate transaction transversal pathway distributions of the model development data and the new transaction data, calculate metrics such as deviation, correlation and K-L distance between the transversal pathway distributions of the developed model and the new transaction dataset; determine a degree of anomaly based on these three metrics and generating an alert according to a predetermined criterion; determine the features attributable to the statistical changes at decision and leaf nodes; determine sample density changes at each traversed node; and determine the bifurcation point using a slope difference technique. The bifurcation points may be indicative of factors influencing the model performance and may be utilized to tune the developed model for better detection performance, modify a fraud detection strategy based on identified factors, or monitor how fraudsters actively change tactics to avert detection by the models utilized to stop fraud.

In yet another aspect, methods, apparatus, and computer program products for detecting fraud pattern changes in the transaction data can include building a decision tree based on a training dataset from a reference dataset, recording pathway traversal information along each pathway of the decision tree for the reference dataset, and calculating a mean and variance of a class probability of all samples over all the pathways. The methods, apparatus, and computer program products can further include obtaining a pathway distribution for a new transaction dataset under investigation, and the mean and variance of the fraud probability of all the samples, and generating a pathway density distribution for the new transaction dataset. The methods, apparatus, and computer program products can further include retrieving pathway density distribution for the reference dataset, and determining a deviation metric between the pathway density distributions of the reference and new datasets on a global level.

In yet another aspect, the methods, apparatus, and computer program products can further include determining the deviation metrics between the sample density distributions along each pathway for the reference and new datasets on a local level, determining the deviation metrics between the feature statistics at each node along each pathway for the reference and new datasets on a local level, and determining likely feature contributors to the pattern changes by analyzing the deviation metrics along each pathway. The methods, apparatus, and computer program products can further include generating an alert or report based on the deviation metrics according to predetermined criteria.

In another aspect, the pathway distribution information can include a class probability at leaf nodes, a pathway density distribution, samples traversed, and feature statistics at each node along each pathway for the reference dataset and the new dataset. The pathway density distribution can refer to the pathway transversal density on each pathway, normalized by the total number of samples. At each feature (node) on the pathway, the sample density can refer to the sample counts normalized by the total number of samples and feature statistics refer the statistic characteristics over the traversed features on a node.

In another aspect, all the samples in the reference dataset can have full class tags from which a decision tree is built. In other aspects when class tags are not utilized, the calculating the deviation metric on a global level can include calculating the deviation between the pathway density distributions of the reference and new datasets, calculating the correlation between the pathway density distribution of the reference and new datasets, calculating the K-L distance based on the information entropy between the pathway density distribution of the reference and new datasets, and calculating the significance tests between the means of the class probability on all the samples for the reference and new datasets. A significance test can include a Wilcoxon test in determining the significant change of the new dataset from the reference dataset. At each feature (node) on the pathway, the sample density can include the sample counts normalized by the total number of samples, and the feature statistics can include the statistics at each feature (node) on the pathway In still another aspect, a weighted average of the three metrics can quantify the difference of pathway distributions to form a single metric in addition to the mean/variance of class probability to generate results on the deviation of the distribution of the new dataset from the reference dataset on a global level, and to generate an alert if the metric exceeds a predetermined criterion. The calculations of the 3 deviation metrics may be in an arbitrary order and some metrics may be not used.

In still another aspect, identifying the likely feature contributors to the pattern changes by using sample density distributions can include obtaining all the sample densities at each node on the pathway for the reference dataset and new dataset, calculating the sample density slope between two adjacent nodes, finding the top slope difference between the reference dataset and the new dataset, and compiling a list of the likely features corresponding to top slope differences.

In yet another aspect, identifying the likely feature contributors to the pattern changes by using the feature statistics at nodes can include obtaining the data samples at each node on the pathway for the reference dataset and new dataset, calculating the statistics of the samples at each node, finding the top differences in statistics between the reference dataset and the new dataset under investigation, and compiling a list of the likely features corresponding to the top differences. The statistic used can be a simple mean or a mean by fitting to a normal distribution for each feature.

In yet another aspect, further combining likely contributors to the pattern changes can include finding the common features in the two feature lists, and further investigating the other features not overlapped in the two feature lists. Identifying the cause of the pattern change can include using a reason code for the derived variables and reporting the causes due to the features, and reporting physical causes in case of primitive variables.

In another aspect, a computer system for detecting fraud pattern changes in transaction data is disclosed. The computer system can include a pathway processor configured to take pathway information of the reference dataset and calculate the pathway information of a new dataset. The system can further include an anomaly evaluation program configured to calculate a deviation metric that can quantify the departure of the pathway density distribution of the new dataset from the reference dataset, and calculate the mean and variance of the class probability of all the samples. The system can further include a pathway feature analyzer configured to calculate feature statistics of the samples at each node along a pathway in a feature statistics module, calculate a sample density at each node along a pathway in a sample density module, compare the measure metrics and predetermined threshold to generate a result, and generate an alert of pattern changes based on the metrics according to predetermined criteria.

In another aspect, the system can further include instructions to cause one or more of the processors to calculate the deviation of the pathway density distributions between the reference dataset and new dataset, calculate the correlation of the pathway density distributions between the reference dataset and new dataset, and calculate entropy-based K-L distance of the two pathway density distributions between the reference dataset and new dataset.

In another aspect, a weighted average of the three metrics may be calculated as a composite metric in addition to the mean and variance of the class probability, and a result may be generated to indicate the pattern change in the new dataset.

In yet another aspect, a system can further include instructions to cause one or more of the processors to calculate sample density slopes between two adjacent nodes along a pathway, determine the top list of features corresponding to large slope differences, calculate statistics of features at each node along a pathway, and determine the top list of features corresponding to large difference of statistics of feature values, combine the two top feature lists, report the overlapped features in the lists (with reason codes) as causes for the pattern change, and generate a watch list for the remaining features.

In another aspect, the statistics of features at each node can be calculated using the mean value by averaging or by fitting a normal distribution in this embodiment. The transaction data may or may not have class tags. With full tags, metrics for individual classes can be obtained. Without full tags, an overall metric across all classes can be obtained.

Other aspects and advantages of the subject matter will be apparent from the following description and the appended claims. It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated herein and constitute a part of this specification, show certain aspects of the subject matter disclosed herein and, together with the description, help explain some of the principles associated with the subject matter disclosed herein. In the drawings, FIG. 1 is a schematic diagram of tree structure and pathways, in accordance with some implementations;

FIG. 2 shows a block diagram illustrating an exemplary pathway transversal evaluating system and pathway analyzer, in accordance with some implementations;

FIG. 3 shows exemplary means (left) and variance (right) of the pathway transversals of all the pathways for three datasets, in accordance with some implementations;

FIG. 4 shows exemplary pathway density distributions of top ten pathways for the three datasets, in accordance with some implementations;

FIG. 5 is a flowchart illustrating a method to detect the pattern change using deviation metrics, in accordance with some implementations;

FIG. 6 shows exemplary sample density distributions along two of top pathways for the three datasets, in accordance with some implementations;

FIG. 7 shows exemplary feature statistics of non-fraud samples at leaf nodes corresponding to two of top pathways for the three datasets, in accordance with some implementations;

FIG. 8 shows exemplary sample density if no tags are present for the three datasets, in accordance with some implementations;

FIG. 9 shows exemplary feature statistics at leaf nodes if no tags are present for the three datasets, in accordance with some implementations; and FIG. 10 is a flow chart illustrating a method to obtain contributing features in pathway feature analyzer which oversees the sample density changes along pathway transversals and feature statistics at leaf or decision nodes, in accordance with some implementations.

Like reference symbols in the various drawings indicate like elements.

DETAILED DESCRIPTION

The present disclosure relates to transaction behavioral analysis and develops methods for detecting transaction pattern changes and determining the contributing factors thereof. Fraud detection is described herein for illustrative purposes, for the simple case of only two class labels (non-fraud and fraud), but the methods described herein should not be construed as being limited to two-class cases or only to payment transactions.

In accordance with some exemplary implementations, fraud detection models can be developed from historical payment transaction data, in which the transactions are explicitly labeled for classes as non-fraud or fraud. With these class labels, many features may be used to model the data sets. The transaction data can be further processed to generate features for the model development. For example, in some implementations of a payment transaction fraud detection system, the features that are defined to model the non-fraud/fraud transactions can include:

a. Daily Average Transaction Amount
b. Daily Average High Amount Transaction
c. Frequency of Transactions
d. Frequency of Cross Border (CB) Transactions
e. Frequency of Card Not Present (CNP) Transactions
f. Frequency of Cash/ATM Transactions
g. Frequency of CB CNP Transactions
h. Frequency of Ecommerce Transactions
i. Frequency of Chip Transactions
j. Frequency of Unattended Gas Transactions
k. Ratio of Transaction Amount to Daily Average Transaction Amount
l. CNP Transaction Amount
m. Ratio of CNP Transaction Amount to Daily Average CNP Transaction Amount
n. CB Transaction Amount
o. Ratio of Transaction CB Transaction Amount to Daily Average CB Transaction Amount
p. Cash/ATM Transaction Amount
q. Ratio of Transaction Cash/ATM Transaction Amount to Daily Average Cash/ATM Transaction Amount
r. Ratio of Transaction Amount 1 day to 1 week
s. Ratio of Card Not Present Transaction Amount 1 day to 1 week
t. Ratio of Cross Border Transaction Amount 1 day to 1 week
u. Maximum values on purchase/cash/CNP/CB transactions
v. Ratio of current Transaction to the Maximum value
w. Ratio/Frequency of transactions on certain Factor/Visa groups
x. MCC Risk
y. Time Risk
z. Geographic Location Risk
aa. Etc.

The above features can capture the signature of fraudulent behavior in a Falcon® fraud detection model, for example. Fraud detection models can use these features as inputs to a neural network to classify transaction data into classes of fraud and non-fraud.

A decision tree can be a different approach by which a tree-like structure is built from the training data (model development dataset or reference dataset thereafter). Starting from the root, each node can be augmented into the tree by comparing all the possible features and picking the feature that provides a maximum information gain. Each leaf can be a terminal node that indicates the predicted class (target). Each node can correspond to a feature (attribute or variable), and the non-terminal nodes can be the internal node or decision node from which a value cut is obtained to maximize information gain. The built tree can be a binary tree which can show the importance of the features.

By way of example, as shown in at least FIGS. 3 and 4, three datasets can be used. The dataset "V13" can be a development (also referred as reference) dataset. The dataset "V14" can be out of time from V13 but in the same geographic region as V13. The dataset "U21" can be another dataset from a different geographic region and may be called an out-of-region dataset. These three datasets are used to illustrate the detection steps and techniques. While datasets can contain transaction samples with two classes and the following figures are drawn with two classes (non-fraud and fraud, for example), the subject matter disclosed herein is not limited to two classes.

The path from the root to each leaf can be defined as a pathway, as seen in FIG. 1. FIG. 1 illustrates eight distinct pathways, each pathway connecting the root to a leaf associated with a likelihood of fraud. For example, one pathway may be represented as 1-2-4-1, traversing variables 1, 2, 4, and then the leaf node 1 can contains all the samples with variable x4 less than the value cut at the decision node (x4) above. Another pathway may be represented as 1-2-4-2, which can also traverse variables 1, 2, 4, but the leaf node 2 can contain all the samples with the variable x4 greater than or equal the cut at the x4 node.

At a leaf node, the likelihood of each class can be determined by the class population. For example in the bi-modal case, if there are m non-fraud samples and n fraud samples reaching a leaf, the fraud probability can be $n/(m+n)$, and the non-fraud probability can be $m/(m+n)$. In the multi-modal cases, the probability of a class $C_i$, $i=1, 2, 3, 4$ etc., can be calculated as the number of samples of class $C_i$ divided by the total number of samples of all classes. These probabilities at each leaf node may be called a predetermined probability of each class. The built tree can then be saved in a memory to use to classify new samples into the target classes. The leaf nodes and decision nodes can also record the statistics of features for the subsets of transactions that transverse the decision nodes and end at the leaf nodes for comparative analysis on the entire feature set.

The built tree may be applied to new datasets for classifications. A new dataset can have the same data format as the reference dataset. Each sample of a new dataset may traverse through the built tree, and each sample may be classified as non-fraud or fraud in the bi-modal case with the predetermined fraud probabilities at leaf nodes. In the multi-modal case, the classification can be set forth with the predetermined probability for each class at leaf nodes. The characteristics of the new dataset can be different from the characteristics of the model development dataset. Therefore, different datasets from different times and locations may exhibit departures from the developed model's characteristics. These departures can serve as indicators of likely fraud pattern and tactic changes. In some implementations, the deviations of the sample transversal density distributions may be a viable indication of the transaction fraud patterns, and the variability of the statistics of the features along pathways may indicate the cause of pattern changes in the new transaction samples.

FIG. 2 illustrates an exemplary pathway evaluating system. The pathway information can be composed of a pathway density distribution and feature statistics along each pathway. The pathway anomaly evaluator can use pathway density distributions to detect pattern changes in the global sense. The pathway feature analyzer can use pathway features as the analyzer delves into each pathway to detect pattern changes and to search for feature changes from root to leaf nodes. In the absence of tags, the clustering method may be utilized to approximate the tags.

The system can include a pathway processor, an anomaly evaluator, and a pathway feature analyzer, all of which may be implemented as one or more processors, computers, or any other devices capable of processing large amounts of unstructured or structured data. In some implementations, the pathway processor can obtain inputs from the reference dataset and from a new dataset of interest. The inputs from each dataset may include a pathway density distribution and feature statistics (sample density at each feature node and variable statistics at the leaf node) along each pathway. The reference distribution can be the base distribution obtained from the development model, including the pathway transversal density, feature statistics, and class likelihood of each pathway. Based on the two input datasets, the pathway processor can calculate the measurement metrics of the distribution difference and send the results to the anomaly evaluator to use the metrics according to one or more predetermined thresholds to detect pattern changes. The pathway feature analyzer can further the investigation by delving into the features along pathways and utilize pathway feature statistics. The pathway feature analyzer may be composed of two processing modules. One of the processing modules can look at the feature statistics on all the nodes along a pathway. The other processing module can peer at the sample density at each node for the dataset. The pathway processor can search for changes in the distribution of features along each pathway and analyze the changes along the pathway to generate a list of possible features attributable to the distribution difference. Based at least in part on this list, the pathway processor can generate and send an alert signal to users in order for them to make decisions concerning remedial strategies.

For a new dataset under investigation, each transaction sample can traverse through the built tree and reach a leaf node to get classified. The likelihood of fraud can be recorded and the mean and variance of the fraud likelihood can be calculated for the entire population or subpopulations of legitimate transactions and fraudulent transactions. FIG. 3 shows an exemplary mean and variance for some data sets over all the pathways. The mean (left subplot) and variance (right subplot) of all the legitimate and fraudulent samples over the entire set of pathways can be calculated respectively. It can be seen that for fraud samples, the mean value can decrease from the in-time test dataset (V13) through the out-of-time dataset (V14) to the out-of-region dataset (U21). For non-fraud samples, the mean value can change less significantly from the in-time dataset, indicating a change in the fraud behaviors. The two-sample Wilcoxon test between the in-time datasets and out-of-time dataset (V14) or out-of-region dataset (U21) may be used, and the p-values may be obtained for a significance test. The p-values (<1e-4) obtained can be much lower than the significance level 0.05, which can be indicative of significant changes in the mean values of the in-time dataset and out-of-region dataset from the in-time dataset (V13). The changes in the statistical characteristics may be suggestive of the pattern changes in the new datasets from the reference dataset. These pattern changes can indicate that individual pathways should be the next investigation to determine cause.

The diagram of the pathway index and transversal density illustrates whether the distribution may be random or dominated by some pathways, or whether pathways are not effective in describing the fraud patterns of new fraud tactics. Accordingly, depicting the frequency of the pathways may not be restricted to transaction fraud detection scenarios but can be applied to other fields for pathway analysis.

Note that the three datasets (V13, V14 and U21) can all have clear class tags, i.e., non-fraud and fraud. Accordingly, each target class can be handled individually in pursuit of further investigation of each target class. In reality, this scenario may be not ideal because class tags may not be available. For example, some samples may not have tags that clearly show that they are non-fraud or fraud in the bi-modal case. With the built tree from the reference dataset (that must have full tags to build a decision tree), the untagged samples in a new dataset may derive their tags from the sample distributions on leaf nodes. For example, a sample can be tagged as non-fraud if the distance to the non-fraud cluster center at a leaf node is shorter than the distance to the fraud cluster center in the bi-modal case. In a multi-modal case, the shortest distance can dictate the approximate tag of the sample. Using this approximation approach, the untagged samples can be tagged based on a relative magnitude of the distances to the cluster centers of the target classes. Once all the untagged samples are tagged by the clustering approach, pathway distribution analysis and feature analysis along pathways may proceed in the same manner as the originally tagged samples.

The pathways of the model development dataset can be referred to as reference pathways. For a new dataset, all the samples can traverse the built tree, and all the pathways can be recorded and compiled in order to detect pattern changes. The pathway density distribution can be calculated using the number of the samples finishing the pathway, divided by the total number of dataset examples. The pathway density distribution of the reference dataset can be sorted by density. Different methods can be employed to define and normalize the density distribution. The pathways of the new data set do not need to be sorted according to pathway density, since the pathway density distribution may exhibit changes for different data sets (for example the transactions in the following year or in a different region). The departure from the reference pathway distributions may therefore be indicative of a change in the fraud patterns in payment transactions in a global sense, and the characteristics of the feature statistics can help drive understanding of the fraud tactics.

By analyzing the pathway transversal density distributions, a new transaction data set exhibiting anomalous behaviors may be identified by some metrics, and an alert based on some predetermined criterion may be generated. For example, a correlation between the reference pathway distribution and new pathway distribution may be less than 0.8, which may indicate pattern changes in the new dataset. The feature analysis along each pathway as a subsequent step may enable detection of which features may be responsible for the changes. Those features in such localized analysis can be analyzed and used for deriving reason codes. Thus, the processors can use the information of the contributing features to generate recommended steps in order to react to these shifts in fraud tactics. For example, new variables can be defined in adaptive analytics models, rule features can be created, and/or new model builds can be started to react to shifting fraud environments.

FIG. 4 shows an example of the density distributions of the reference pathways (in-time, shown as the line with embedded square shapes) and pathways of two new data sets (out-of-time in-region V14—shown as the line with embedded circles) and out-of-region U21 (shown as the line with embedded triangles). The top ten transversal pathways from the reference dataset can be selected for demonstration purposes and can account for 65% of the total transversals. The new datasets can include a transaction data set from a different time in the same region (V14) and a transaction dataset from a different region (U21). The left plot shows the comparison for non-fraud samples, and the right plot shows the comparison for fraud samples. The reference pathways can be ordered by density, and the pathways can be dominated by non-fraud samples. FIG. 4 shows that the transversal pathway densities can change from the reference dataset in different pathways in two aspects: deviations from the model development dataset, and similarity/dissimilarity between the datasets. Those changes in distributions can be the signature of the pattern changes, and metrics may be designed to detect and quantify the characteristic changes.

Also referring to FIG. 4, the in-time dataset can globally show a closer similarity to the reference distribution than the out-of-region dataset in both non-fraud and fraud populations. Detailed examinations can show that on some pathways the deviations are larger, while on other pathways the difference is quite small. Each pathway can have its own feature list from root to leaf, and the large difference between the features traversed may point to the features that may contribute to the pattern changes. This is described in further detail below. In summary, the transversal density distributions can suggest a change in the intrinsic characteristics of the non-fraud/fraud pattern, although the changes in the non-fraud population seem to be smaller and a distance measure can determine whether the fraud shift exceeds a global shift in cardholder usage.

In some implementations, as a first step the fraud pattern changes can be detected by determining a transversal density pattern of the pathways involved and comparing that transversal density pattern to a reference transversal density pattern. In other words, to detect and/or identify pattern changes, the density distribution can be compared to a corresponding density distribution for the same comparison basis (for example, using the same number of fraud samples to compare). Based on the transversal density distribution and the reference density distribution, distribution metrics can be used, to include deviation, correlation and a divergence metric as a measure of dissimilarity between the two density distributions as follows.

A first metric can be obtained using an average deviation that is calculated between the two density distributions, and given as follows:

$$\text{deviation} = \sqrt{\sum_{i=1}^{n}[P(i)-Q(i)]^2}/n$$

where n is the number of pathways and P and Q are two density distributions. In some implementations, P can be the pathway distribution of the reference dataset, and Q can be the pathway distribution of the new dataset under investigation, or vice versa.

The density deviation can be indicative of a departure of the new data's distribution from the reference pathway distribution. The lower deviation can illustrate the closeness of the two distributions and that the fraud patterns are less changed. The larger deviation, on the contrary, can show that new data has a higher chance of a fraud pattern change from the reference data. Therefore, the distribution deviation can be an indicator of the pattern changes in the new dataset from the reference dataset.

A second metric can be the correlation of the two density distributions. The correlation coefficient may show whether the two distributions are well correlated. If the correlation coefficient is close to 1, the two distributions can show similar variation patterns (i.e. no fraud pattern changes can be seen). Generally, the smaller the correlation coefficient, the larger the likelihood that a pattern change can be detected.

The third metric can be the K-L (Kullback-Leibler) distance. The symmetric form of the measure of distance between two density distributions can be used. Specifically, the K-L distance metric is given by $$K\text{-}L \text{ distance} = \sum_{i=1}^{n}\left[P(i)\log\frac{P(i)}{Q(i)} + Q(i)\log\frac{Q(i)}{P(i)}\right]/2$$

where n is the number of possible values for a discrete variable (for example, number of pathways), and P and Q are two pathway density distributions. In some implementations, P can represent the reference density distribution, and Q can represent the new dataset score distribution, or vice versa.

If the two pathway density distributions (reference and new test density distributions) are very close, the K-L distance can be close to 0. A larger K-L distance can be representative of a dissimilarity between the two distributions. Therefore K-L distance can also be a good indicator of the similarity between the two density distributions.

Although the departure of the pathway density distribution of a new dataset of interest from the reference density may be dependent on an aggregate of the three metrics derived above, it may be not a simple sum of each metric. Instead the deviation metric may be computed using a weighted average that incorporates the three metrics. A person skilled in the art will appreciate the vast number of useful ways these metrics may be combined to form a deviation measure between the pathway distributions. The one or more metrics may be used to characterize the distribution pattern change for each class.

The comparison of the metrics between classes may indicate whether the changes are similar or dissimilar across all the classes. For example, in the bi-modal case, the metrics can be calculated for non-fraud and fraud classes separately, and a difference between the two metrics may show whether the non-fraud and fraud classes change in a similar manner or not. If the difference exceeds some threshold, then the different variation patterns for fraud and non-fraud classes may persist. For multi-modal cases, the metric to measure the difference metrics may be the difference between the maximum and minimum values of the metrics, as represented by the following equation:

span=max(metrics for all classes)−min(metrics for all classes)

The span can be compared against some threshold, and different variation patterns across classes may persist. In addition, the comparison of the pathway density distributions for all samples without tags may be made by using a similar metric in order to characterize total population behavioral shifts from the reference dataset to the new dataset.

FIG. 5 depicts a flowchart of a method for detecting fraud pattern changes in payment transactions on a global level in accordance with some implementations. The flowchart details the procedure in the pathway anomaly evaluator, referring to FIG. 2. In some implementations, a development model can be chosen to be a reference dataset, and the pathway density distribution may be obtained by using the test data which is disjointed with the training data. An example reference dataset can include payment transactions in a North American country. The model was developed and used as a reference model (V13). Exemplary new datasets can include 1) payment transactions for the same country but in a different year, which can be called an out-of-time dataset (V14); and 2) payment transactions for another country also in North America, which can be called an out-of-region dataset (U21). Transaction patterns and fraud patterns may change from time to time in the same region and can also change from region to region. The pathway density distribution difference between the reference dataset and new dataset under investigation may serve as a significant indicator of the likely fraud pattern changes.

As shown in FIG. 5, initially in step 501, a pathway density distribution can be generated for the new dataset under investigation by traversing through the built tree, and the pathway density distributions can be normalized. The reference dataset density distribution can be retrieved and imported to make comparisons. In step 502, the pathway density distribution for the transaction dataset under investigation may be different from that of the reference data set due to fraud pattern changes. These changes may be a result of a fraudster's change in behavior at different times (for example, fraudsters change behavior in different times with new fraudulent schemes) or due to a change in spatial factor (for example, fraudsters behave differently in two different regions).

In step 503, the deviation of the pathway density distribution under investigation (obtained in step 501) relative to the reference pathway density distribution (obtained in step 502) may be calculated. The deviation calculation method has been described as above. In step 504, the correlation of the two density distributions may be calculated. In step 505, the K-L distance between the two densities or feature distributions may be calculated. In step 506, the anomaly in the pathway density or feature distribution under investigation may be evaluated based on the metrics, such as deviation, correlation, and K-L distance. An alert may be generated based on the predetermined criteria. The criteria may be a combination of the three metrics, deviation, correlation or K-L distance. For example, a criterion may be that the correlation is less than 0.8. If the correlation falls below 0.8, it may signal that there may be some pattern change seen from the pathway density distribution curves. In another example, the criterion may be that the K-L distance is less than 0.1. The calculated K-L distance can be compared with the threshold. If the threshold is exceeded, there may be a high likelihood of a change in pattern.

Using the deviation metrics of the pathway density distribution, likely changes in transaction patterns may be revealed for transaction monitoring. Investigation of features along pathways may excavate the likely features that may contribute to the changes in the transaction pattern. For example, along a pathway, the density of samples at each node may be different from the reference tree structure due to the variability of the new data sets. The sample density distribution along a pathway may contain some vital information of the possible features responsible for changes.

FIG. 6 illustrates sample distributions along two of the top pathways (p1 and p2) with class tags. These two pathways can take nearly 40% of sample transversals and can display different responses to the three datasets, as seen in FIG. 4. The lengths of the two pathways can be different, and the sample densities at each node can vary with datasets as well. For example, pathway p1 can have twelve nodes to traverse, while pathway p2 can have ten nodes to traverse. As can be seen, pathway p1 can respond to the in-time and out-of-time datasets nearly similarly, both taking ~20% of samples (seen as the non-fraud density at the leaf node X90). On the other hand, pathway p2 can still take ~20% of samples from the in-time dataset. However, it can lose half of the samples for the out-of-time datasets (seen as the non-fraud density at the leaf node X23). Two feature statistics of non-fraud and fraud samples can be shown for each pathway (for example, pathways p1 and p2). The features can be arranged on the vertical axis in a specified order (for example, from root to leaf or from top to bottom). The horizontal axis can denote the sample population density. For example, a non-fraud sample density can correspond to the number of non-fraud samples at each feature divided by a total number of non-fraud samples. Likewise, a fraud sample density can correspond to the number of fraud samples at each feature divided by a total number of fraud samples. Other techniques can be employed to normalize the numbers of samples for each class. The graphs in FIG. 6 exemplify the variations of the sample density for the three datasets on two of the top pathways.

Referring again to FIG. 6, starting from the root (i.e., X39), the sample density can drop toward a leaf node due to node splits. The curved line with the embedded square shapes can represent the sample density for the model development dataset (V13); the curved line with the embedded circle shapes can represent the sample density for the out-of-time dataset (V14); and the curved line with the embedded triangle shapes can represent the sample density for the out-of-region dataset (U21). Visible differences between the curves may be suggestive of feature contributors. For example, for pathway 1, both the out-of-time curve (curved line with the embedded circle shapes) and the out-of-region curve (curved line with the embedded triangle shapes) can start to drift by a large amount at feature node X89. For pathway 2, the out-of-region curve can also start to drift at feature node X89 for the non-fraud sample density.

In some implementations, a metric can be used to evaluate the changes by looking at the loss of sample densities between two neighbor nodes. The change in the fraud pattern may be signified by changes in sample densities at nodes along each pathway with respect to the reference dataset. For example, the difference between the two sample densities at two adjacent nodes (i.e., the slope) may be used. One exemplary metric may be:

$$\text{Slope}_i = N_i - N_{i+1}, \ i=1 \text{ to (leaf node index}-1)$$

$$\Delta\text{Slope}_i = |\text{Slope}_i^{reference\ dataset} - \text{Slope}_i^{new\ dataset}|$$

where i is the depth from root, and N is the sample density at each depth (node). For each pathway, the slope difference, ΔSlope, may be calculated at each node, and the max difference may be obtained for each pathway. A list of features, corresponding to the large differences, attributable to the top differences may contain the likely contributors. Other metrics may be used, such as a percentage of change, or the difference divided by the sum of two sample densities, for example.

Again referring to FIG. 6, for example, for pathway p1, the slope between X43 and X89 is 7.2% for non-fraud samples in the reference dataset and 19.6% in the new dataset (out-of-time, line with embedded circle shapes). The slope difference may be 12.4%, which can mean that the new dataset is deficient at X89 by 12.4% relative to the reference dataset. The top five slope differences, for example, may be tabulated, and the top possible features corresponding to those large changes may be investigated as to being indicators of the change in the fraud and non-fraud population dynamics. For example, for pathway p1 on the left of FIG.

6, it may be found that X89 contributes to a large loss of non-fraud density. This technique may apply to the non-fraud and fraud curves on each pathway, and a list of likely features that may be attributable to the pattern changes can be produced. For the two top pathways, for example, the likely features may be X89 and X39. Other pathways may provide extra features that have large slope changes.

Note that pathways p1 and p2 can share the same route until feature X39. Below X39, pathways p1 and p2 can diverge. The comparison between the two pathways below the node X92 is noteworthy. For example, the in-time (line with embedded square shapes) and out-of-time (line with embedded circle shapes) sample density can merge to the same density on pathway p1 at node X39, while the out-of-time density can fall below the in-time density. This behavior can signify that at this depth the distributions are significantly different on feature X39.

Obtained features X89 and X39 may be large contributors to the pattern changes in the above examples. If these are raw variables, then the likely reason for these changes can be determined. If these are derived variables, then the root cause may be found based on a derivation. A reason code may be found for such variables and, consequently, the cause of the changes may be convenient to locate. In this example, using these reason codes, the feature X89 may correspond to a cause of "unusual time of day/week/year behavior." This reason code can indicate that fraudsters may shift tactics during unusual times of fraudulent transactions. X39 may, for example, correspond to a cause of "suspicious unattended gas activity." Therefore, the feature analysis along each pathway may provide a valuable method to identify the likely cause of the pattern changes. This information may be useful in adaptive analytics or in flash fraud rules. Within adaptive models, the weight of this feature can adjust according to the tactical changes to mitigate financial losses.

Other information along the pathway can also be helpful, such as feature statistics of all the samples at each leaf node. FIG. 7 shows example feature statistics at a leaf node corresponding to the top pathways p1 on the left and p2 on the right. In this method, all of the samples at the leaf node can be counted, and only those features that are passed from the root to the leaf node can be considered to obtain statistics. The intuition is that if the transaction patterns have little changes at all, the feature statistics at the leaf node between the reference dataset and the new dataset under investigation will be similar. Otherwise, the characteristics can show a big difference. A metric, like the mean value, can be computed for relevant features at the leaf node using the following equation:

$$\text{Mean}_i = 1/N \Sigma X_i, \quad i = \text{feature index traversed}$$

where N is the total number of samples at a leaf node, and X is the value of the feature in all the samples at a leaf node. Other metrics may also be used such as fitting a normal distribution to find means of distributions.

The mean values are obtained for non-fraud samples on pathway p1 (on the left) and on pathway p2 (on the right). The curves with embedded square shapes, embedded circle shapes, and embedded triangle shapes can correspond to the in-time dataset (V13), the out-of-time dataset (V14), and the out-of-region dataset (U21). Since fraud samples can occupy much smaller proportions than non-fraud samples at a leaf node most of the time, the mean values may not be easily compared with non-fraud samples. Generally, the closer the mean value curves are, the closer the transaction patterns in the two datasets are. The comparison of mean values among datasets can indicate that the mean of the out-of-time dataset may be close to the mean of the in-time dataset for the non-fraud and total samples. Close examination can reveal that bigger differences may appear for feature X92 between the in-time dataset and the out-of-time dataset. These differences can be suggestive of changes associated with that feature. Other differences can exist at feature X8, for example.

Various metrics may be used to measure the difference and reveal the likely cause for the pattern changes, as shown in FIG. 4. These metrics can include the difference in mean values, for example. A significance test, such as a Wilcoxon test, may be performed to verify the significance of the change. A relative difference may be used as a measure to signify the changes caused by a feature. If the relative difference is greater than 30%, for example, there may be a high likelihood of pattern change by the feature.

The out-of-region dataset can show high variability around the reference feature statistics in FIG. 7. Note that this dataset can be obtained from a different geographic region, and characteristics of the features may be quite different from those of the model development dataset. The high variability can be consistent with the notion that the transaction patterns may be quite different from the reference dataset. Therefore, the feature statistics at the leaf nodes may be a differentiator between the distant dataset (such as the out-of-region dataset) and the close dataset (out-of-time dataset).

A similar approach can be applicable when there are no tags for the transaction samples. For example, FIG. 8 shows pathway features without tags for the top three pathways (shown in FIG. 4), which can be representative of scenarios when full fraud reporting is not available. The sample density can be obtained for each pathway by combining all of the traversed samples. The difference in sample density between two adjacent nodes may be calculated and quantified. The top differences between the reference dataset and the new dataset may be obtained for top pathways. For example, in FIG. 8, features X89, X39, or X31 can indicate a high likelihood of fraud pattern changes. Those variables or their root variables may be investigated for the cause of the pattern changes.

FIG. 9 shows a variability of mean values for all the samples at a leaf node corresponding to pathways p1 (left) and p2 (right) without tags. In this implementation, the feature statistics of the total samples at a leaf node may be indicative of a transaction pattern change. As for the all samples at each leaf node, the out-of-time curve can be close to the in-time curve. Divergence can be seen at a few features, which can point to the contributing variables. For example, variables X92 and X8 may attribute the change due to a large deviation when a difference is used as a metric. The same feature statistics may be obtained for other pathways, and a group of likely feature contributors without full fraud reporting may be obtained for further attention. Together with the sample density distribution along each pathway, a likely list of meaningful contributors can be obtained for further investigation.

The same method can be used at all the decision nodes as well for refinement. In the same fashion, each decision node can record the traversed samples from different datasets so that feature statistics (for example, means of all the samples on each feature) can be computed in the same manner as at the leaf node. The extra information obtained at these decision nodes can be useful in refining the likely contributor list described above.

The method can be implemented in the pathway feature analyzer, as shown in the flow chart in FIG. 10, to detect tactical changes and shifts. The flowchart of FIG. 10 details the procedure of the pathway feature analyzer, which can use two modules to better understand the fraudster's tactical changes. At step 1001, the sample density at each top pathway can be obtained for the new dataset. Feature statistics can also be obtained at each leaf node and decision nodes that are traversed in each top pathway. The sample density variation along the pathway and feature statistics at leaf and decision nodes for the reference dataset may be retrieved for comparison at step 1002.

The sample density distributions on each top pathway can be compared, and the slopes between neighboring nodes can be compared and quantified. If they exceed a predetermined threshold, the feature is marked as a likely candidate for investigation of a potential pattern/tactic change. This can be performed at step 1003, which generates a list of features that may be indicative of the cause of the pattern change detected in FIG. 5. At step 1004, the pathway feature analyzer can calculate the deviation at each leaf and decision nodes for the features involved in each top pathway. A metric may be used to quantify the deviation at each feature for each top pathway. For example, the simple difference between the mean values at each feature may be used. At step 1005, the top deviations may be found at the features which may be combined with the list obtained through step 1003 to form a likely contributor list for investigation at step 1006. If these variables are derived variables, then the root variables may be found which may be responsible for the pattern changes in the new dataset from the developed model. These causes may be found in the reason codes of those features. These causes may be reported and utilized to refine adaptive analytics by adjusting weights in response to a fraudster's tactical changes from time to time and/or from region to region.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

While the disclosed subject matter has been described with respect to a limited number of implementations, those skilled in the art having benefit of this disclosure, will appreciate that other implementations can be devised which do not depart from the scope of the invention as disclosed herein. Accordingly the scope of the invention should not be limited only by the attached claims. Further, the steps of the disclosed methods may be modified in any manner, including reordering steps and/or inserting or deleting steps.

What is claimed is:

1. A method of fraud-detection that detects one or more fraud pattern changes in one or more transactions using machine learning, the method comprising:
building, by at least one processor, a decision tree based on a training dataset from a reference dataset;

recording, by the at least one processor, pathway transversal information along one or more pathways traversed in the decision tree for the reference dataset;

calculating, by the at least one processor, a first mean and a first variance of a class probability of one or more samples over the one or more pathways;

obtaining, by the at least one processor, a pathway distribution for a new transaction dataset under investigation and a second mean and a second variance of the one or more samples of the new transaction dataset, the second mean and the second variance being representatives of a fraud probability;

retrieving, by the at least one processor, a first pathway density distribution for the reference dataset along at least a first pathway from among the one or more pathways traversed in the decision tree;

generating, by the at least one processor, a second pathway density distribution for the new transaction dataset along at least a second pathway from among the one or more pathways traversed in the decision tree;

determining, by the at least one processor, deviation metrics between the first pathway density distribution and the second pathway density distribution on a global level;

determining, by the at least one processor, the deviation metrics between the first pathway density distribution and the second pathway density distribution on a local level;

determining, by the at least one processor, the deviation metrics between one or more feature statistics of a feature along at least one pathway for the reference dataset and at least one pathway for the new transaction dataset on the local level; and analyzing, by the at least one processor, the deviation metrics obtained from one or more pathway density distributions on the global level or one or more pathway density distributions on the local level that detects one or more feature contributors to one or more pattern changes, the one or more pattern changes being indicative of the new transaction exhibiting anomalous behavior;

where the determining the deviation metrics on the global level includes one or more of the following:

calculating, by the at least one processor, a deviation between the first pathway density distribution and the second pathway density distribution;

calculating, by the at least one processor, a correlation between the first pathway density distribution and the second pathway density distribution; and calculating, by the at least one processor, a Kullback-Leibler distance based on information entropy between the first pathway density distribution and the second pathway density distribution;

determining, by the at least one processor, a weighted average of the deviation, the correlation, and the Kullback-Leibler distance;

generating, by the at least one processor, one or more results representative of a difference between the new transaction dataset and the reference dataset on the global level using at least the weighted average;

generating, by the at least one processor, an alert if the weighted average exceeds a predetermined threshold; and where the one or more feature contributors is detected based on a sample density distribution, the detecting comprising:

obtaining, by the at least one processor, one or more sample densities at one or more nodes on the first pathway for the reference dataset;

obtaining, by the at least one processor, one or more sample densities at one or more nodes on the second pathway for the new dataset;

calculating, by the at least one processor, a sample density slope between adjacent nodes on the first pathway and the second pathway;

determining, by the at least one processor, a maximum slope difference between the reference dataset and the new transaction dataset; and compiling, by the at least one processor, a list of the one or more features associated with the maximum slope difference.

2. The method of claim 1, where the first pathway density distribution and the second pathway density distribution are representative of a pathway transversal density along the first pathway and the second pathway, the pathway transversal density being normalized by a total number of samples.

3. The method of claim 1, where the one or more feature contributors is detected based on one or more feature statistics at one or more nodes, the detecting comprising:

obtaining, by the at least one processor, one or more data samples at one or more nodes on the first pathway for the reference dataset;

obtaining, by the at least one processor, one or more data samples at one or more nodes on the second pathway for the new transaction dataset;

calculating, by the at least one processor, one or more statistics of the data samples at the one or more nodes on the first pathway and at the one or more nodes on the second pathway;

finding, by the at least one processor, a difference in statistics between the reference dataset and the new transaction dataset; and compiling, by the at least one processor, a list of the one or more features associated with the difference.

4. A non-transitory computer-readable medium containing instructions that configure a processor to perform operations that detects one or more fraud pattern changes in one or more transactions using machine learning, the operations comprising:

building a decision tree based on a training dataset from a reference dataset;

recording pathway transversal information along one or more pathways traversed in the decision tree for the reference dataset;

calculating a first mean and a first variance of a class probability of one or more samples over the one or more pathways;

obtaining a pathway distribution for a new transaction dataset under investigation a second mean and a second variance of the one or more samples of the new transaction dataset, the second mean and the second variance being representatives of a fraud probability;

retrieving a first pathway density distribution for the reference dataset along at least a first pathway from among the one or more pathways traversed in the decision tree;

generating a second pathway density distribution for the new transaction dataset along at least a second pathway from among the one or more pathways traversed in the decision tree;

determining deviation metrics between the first pathway density distribution and the second pathway density distribution on a global level;

determining the deviation metrics between the first pathway density distribution and the second pathway density distribution on a local level;

determining the deviation metrics between one or more feature statistics of a feature along at least one pathway for the reference dataset and at least one pathway for the new transaction dataset on the local level; and analyzing the deviation metrics obtained from one or more pathway density distributions on the global level or one or more pathway density distributions on the local level that detects one or more feature contributors to one or more pattern changes, the one or more pattern changes being indicative of the new transaction exhibiting anomalous behavior;

where the determining the deviation metrics on the global level includes one or more of the following:

calculating a deviation between the first pathway density distribution and the second pathway density distribution;

calculating a correlation between the first pathway density distribution and the second pathway density distribution; and calculating a Kullback-Leibler distance based on information entropy between the first pathway density distribution and the second pathway density distribution;

determining a weighted average of the deviation, the correlation, and the Kullback-Leibler distance;

generating one or more results representative of a difference between the new transaction dataset and the reference dataset on the global level using at least the weighted average;

generating an alert if the weighted average exceeds a predetermined threshold; and where the one or more feature contributors is detected based on a sample density distribution, the detecting comprising:

obtaining one or more sample densities at one or more nodes on the first pathway for the reference dataset;

obtaining one or more sample densities at one or more nodes on the second pathway for the new dataset;

calculating a sample density slope between adjacent nodes on the first pathway and the second pathway;

determining a maximum slope difference between the reference dataset and the new transaction dataset; and compiling a list of the one or more features associated with the maximum slope difference.

5. The non-transitory computer-readable medium of claim 4, wherein the first pathway density distribution and the second pathway density distribution are representative of a pathway transversal density along the first pathway and the second pathway, the pathway transversal density being normalized by a total number of samples.

6. The non-transitory computer-readable medium of claim 4, wherein the one or more feature contributors is detected based on one or more feature statistics at one or more nodes, the determining comprising:

obtaining one or more data samples at one or more nodes on the first pathway for the reference dataset; obtaining one or more data samples at one or more nodes on the second pathway for the new transaction dataset;

calculating one or more statistics of the data samples at the one or more nodes on the first pathway and at the one or more nodes on the second pathway;

finding a difference in statistics between the reference dataset and the new transaction dataset; and compiling a list of the one or more features associated with the difference.

7. A system of fraud-detection that detects one or more fraud pattern changes in one or more transactions using machine learning comprising: at least memory; and at least one processor configured to:

build a decision tree based on a training dataset from a reference dataset;

record pathway transversal information along one or more pathways traversed in the decision tree for the reference dataset;

calculate a first mean and a first variance of a class probability of one or more samples over the one or more pathways;

obtain a pathway distribution for a new transaction dataset under investigation and a second mean and a second variance of the one or more samples of the new transaction dataset, the second mean and the second variance being representatives of a fraud probability;

retrieve a first pathway density distribution for the reference dataset along at least a first pathway from among the one or more pathways traversed in the decision tree;

generate a second pathway density distribution for the new transaction dataset along at least a second pathway from among the one or more pathways traversed in the decision tree;

determine deviation metrics between the first pathway density distribution and the second pathway density distribution on a global level;

determine the deviation metrics between the first pathway density distribution and the second pathway density distribution on a local level;

determine the deviation metrics between one or more feature statistics of a feature along at least one pathway for the reference dataset and at least one pathway for the new transaction dataset on the local level; and analyze the deviation metrics obtained from one or more pathway density distributions on the global level or one or more pathway density distributions on the local level that detects one or more feature contributors to one or more pattern changes, the one or more pattern changes being indicative of the new transaction exhibiting anomalous behavior;

where the determining the deviation metrics on the global level includes one or more of the following:

calculate a deviation between the first pathway density distribution and the second pathway density distribution;

calculate a correlation between the first pathway density distribution and the second pathway density distribution; and calculate a Kullback-Leibler distance based on information entropy between the first pathway density distribution and the second pathway density distribution;

determine a weighted average of the deviation, the correlation, and the Kullback-Leibler distance;

generate one or more results representative of a difference between the new transaction dataset and the reference dataset on the global level using at least the weighted average;

generate an alert if the weighted average exceeds a predetermined threshold; and where the one or more feature contributors is detected based on a sample density distribution, the detecting comprising:

obtain one or more sample densities at one or more nodes on the first pathway for the reference dataset;
obtain one or more sample densities at one or more nodes on the second pathway for the new dataset;
calculate a sample density slope between adjacent nodes on the first pathway and the second pathway;
determine a maximum slope difference between the reference dataset and the new transaction dataset; and
compile a list of the one or more features associated with the maximum slope difference.

8. The system of claim 7, where the at least one processor is further configured to calculate a significance of a difference between means of class probabilities on one or more samples of the reference dataset and one or more samples of the new transaction dataset using a Wilcoxon test.

\* \* \* \* \*